(12) United States Patent
Hubble et al.

(10) Patent No.: US 12,422,312 B2
(45) Date of Patent: Sep. 23, 2025

(54) SPINNING FLAT PLATE CALORIMETER

(71) Applicants: David O. Hubble, King George, VA (US); Peter L. Wick, Jr., Fredericksburg, VA (US)

(72) Inventors: David O. Hubble, King George, VA (US); Peter L. Wick, Jr., Fredericksburg, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 468 days.

(21) Appl. No.: 17/975,888

(22) Filed: Oct. 28, 2022

(65) Prior Publication Data
US 2023/0152167 A1  May 18, 2023

Related U.S. Application Data

(63) Continuation-in-part of application No. 17/524,886, filed on Nov. 12, 2021, now Pat. No. 11,822,144.

(51) Int. Cl.
*G01K 17/00* (2006.01)
*G01K 7/18* (2006.01)

(52) U.S. Cl.
CPC ............ *G01K 17/003* (2013.01); *G01K 7/18* (2013.01)

(58) Field of Classification Search
CPC ......... G01K 17/003; G01K 7/18; G01K 17/00
See application file for complete search history.

(56) References Cited

U.S. PATENT DOCUMENTS

| 4,413,916 | A * | 11/1983 | Seguin | G01K 17/003 374/E17.002 |
| 5,316,380 | A * | 5/1994 | Secemski | G01K 17/003 356/216 |
| 5,409,314 | A * | 4/1995 | Laakmann | G01K 17/003 356/216 |
| 9,678,025 | B1 * | 6/2017 | Fesmire | G01N 25/72 |
| 2012/0002193 | A1 * | 1/2012 | Elliott | G01K 17/003 356/121 |
| 2017/0080748 | A1 * | 3/2017 | Clark, II | B60B 7/008 |

(Continued)

FOREIGN PATENT DOCUMENTS

| CA | 3093432 A1 * | 9/2019 | ............. G01K 1/026 |
| CN | 208476363 U * | 2/2019 | |
| CN | 111707386 A * | 9/2020 | ............... G01K 1/14 |

(Continued)

*Primary Examiner* — Laura Martin
*Assistant Examiner* — Julia Fitzpatrick
(74) *Attorney, Agent, or Firm* — Gerhard W. Thielman

(57) ABSTRACT

A spinning flat plate calorimeter device is provided for receiving and measuring laser energy. The device includes a circular disk, a shaft, a structure and a motor. The circular disk has temperature-detection instrumentation for measuring temperature from the laser energy. The shaft is supported by distal and proximal bearings. The structure supports the disk, shaft and its bearings. The motor turns the shaft and the disk. Additionally, the disk further includes a flat plate, a yoke wheel and a plurality of spacers. The plate has an obverse face for receiving the laser energy and a reverse face with a spiral groove for attaching the instrumentation. The yoke wheel attaches to the shaft. The thermal isolator spacers mechanically attach the yoke wheel to the flat plate.

10 Claims, 4 Drawing Sheets

(56) References Cited

U.S. PATENT DOCUMENTS

2019/0137335 A1 * 5/2019 Fiordilino ............. G01J 1/0252

FOREIGN PATENT DOCUMENTS

| CN | 113390526 A | * | 9/2021 | ............. F25B 15/00 |
| DE | 3617112 A1 | * | 11/1987 | |
| DE | 102010050660 B4 | * | 1/2015 | ............... G01K 1/12 |
| DK | 201970145 A1 | * | 9/2020 | |
| EP | 0506725 B1 | * | 5/1994 | |
| JP | H0694739 A | * | 4/1994 | |
| KR | 101774734 B1 | * | 9/2017 | |
| WO | WO-2020203183 A1 | * | 10/2020 | ............. G01F 1/662 |

* cited by examiner

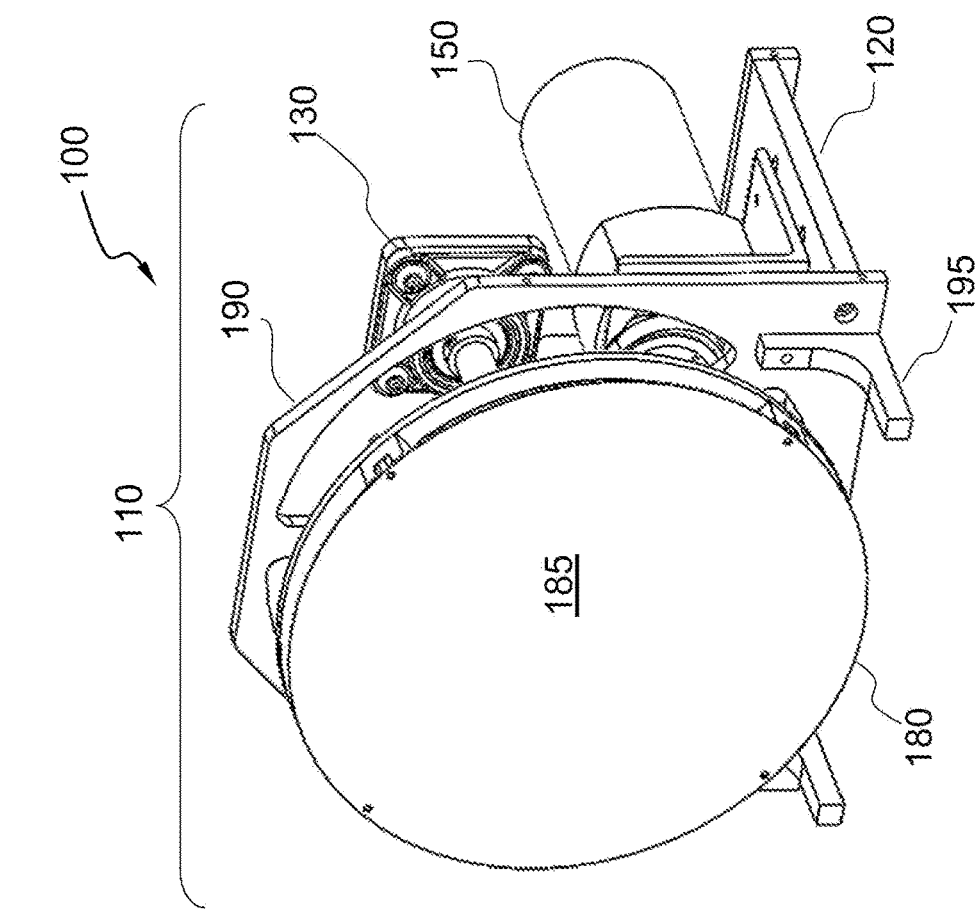
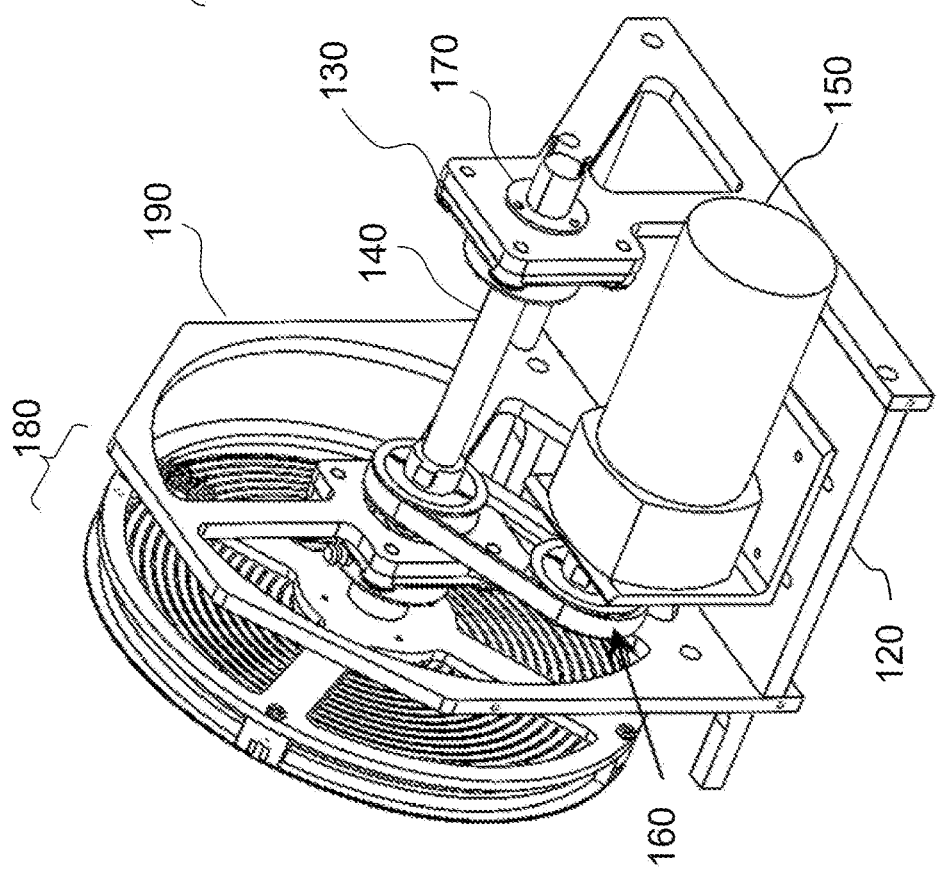
FIG. 1A
FIG. 1B

SPINNING FLAT PLATE CALORIMETER

CROSS REFERENCE TO RELATED APPLICATION

The invention is a Continuation-in-Part, claims priority to and incorporates by reference in its entirety U.S. patent application Ser. No. 17/524,886 filed Nov. 12, 2021 and assigned Navy Case 210335.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to laser calorimeters. In particular, the invention relates to rotating flat plate calorimeters for measuring heat flux from high energy lasers.

SUMMARY

Conventional calorimeters yield disadvantages addressed by various exemplary embodiments of the present invention. In particular, various exemplary embodiments provide a spinning flat plate calorimeter device for receiving and measuring laser energy. The device includes a circular disk, a shaft, a structure and a motor. The circular disk has temperature-detection instrumentation for measuring temperature from the laser energy. The shaft is supported by distal and proximal bearings. The structure supports the disk, shaft and its bearings. The motor turns the shaft and the disk.

Other various embodiments additionally provide for the disk further including a flat plate, a yoke wheel and a plurality of spacers. The plate has an obverse face for receiving the laser energy and a reverse face with a spiral groove for attaching the instrumentation. The yoke wheel attaches to the shaft. The thermal isolator spacers mechanically attach the yoke wheel to the flat plate.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 1A and 1B are isometric assembly views of an exemplary flat plate calorimeter (FPC) device;

DETAILED DESCRIPTION

Figure 2:
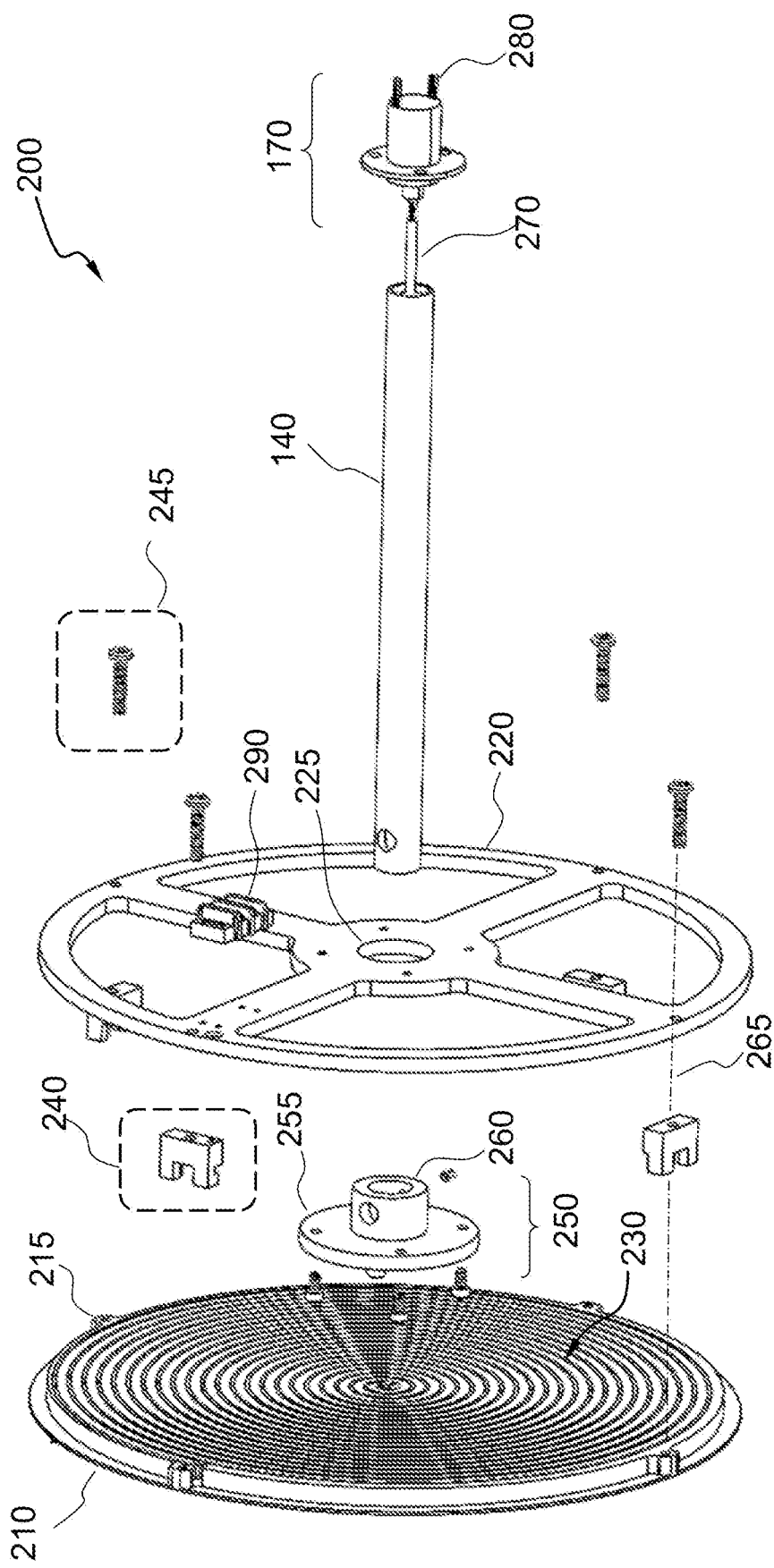
FIG. 2 is an isometric exploded view of components for turning components of the FPC device.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs quantity units with the following abbreviations: length in inches (") or meters (m), mass in grams (g), time in seconds (s), angles in degrees(°), force in newtons (N), temperature in kelvins (K), energy in joules (J), power in watts (W) and frequencies in gigahertz (GHz). Supplemental measures can be derived from these, such as energy fluence in joules-per-square-meter ($J/m^2$) and the like.

The exemplary Flat Plate calorimeter (FPC) has demonstrated its ability to accurately measure the downrange performance of high energy laser (HEL) systems. With increasing operating power of these HEL systems, difficulties arise in producing a power meter that can survive the engagement. By spinning the FPC's absorber plate, the laser's energy is spread out over a much larger area, and the power handling capabilities of the sensor are significantly increased. This enables the FPC to be used as HEL systems are improved.

Accurately measuring the downrange power of an HEL system is necessary in order to access system performance. The exemplary FPC was developed specifically for this task and has been used to measure HEL power (W). By simultaneously imaging the surface of the FPC, the laser spot size can be measured, which enables the irradiance ($W/m^2$) to be determined. As HEL system performance improves, the power increases and the spot size on target decreases. Both of these improvements will cause the anticipated downrange irradiances to increase.

Each material has a fluence ($J/m^2$) limit, beyond which it will suffer damage and/or degradation. In the case of an FPC, exceeding the specific design's fluence limit can either destroy the surface coating or damage the sensor wire imbedded within the sensor. Reflective surface coatings, such as gold, can serve to increase the sensor's fluence limit, but these techniques have limitations and also decrease the FPC's sensitivity (by increased reflectivity and thereby reduced emissivity), as well as increase its noise floor.

By spinning the sensor plate, and aiming the laser spot some radial distance from the center of rotation, the laser's energy is spread out over an annular area that is much larger than the laser spot area. The FPC's fluence limit is effectively increased by the ratio of this annular area to the laser spot area. Ratios of ten or more are easily achieved.

Furthermore, imaging laser spots off of a spinning target has long been known to give the most accurate spatial representation of the spot structure. Any surface imperfections that would cause speckle in the image are effectively averaged out by the moving surface. A spinning FPC enables a single device to be used for both accurate spot size and HEL power measurements.

Conventionally, in order to increase power handling, beam splitters are often used to direct some small percentage (i.e. 3%) of the beam's power onto the power meter. This is a cumbersome procedure that is very geometrically sensitive to the relative location of the laser source to target. Error is also introduced if the exact value of the splitter's reflection-to-transmission ratio is not known to a high precision.

As alternatives, conventional water cooled power meters are also available, but these are cumbersome to use due to the requirement for a pump, hoses, and support equipment. They also have much slower time responses compared to this device and do not enable simultaneous beam imaging.

FIGS. 1A and 1B show perspective assembly views 100 of an exemplary spinning FPC assembly 110. This includes an aluminum base frame 120 that supports distal bearings 130 for a hollow shaft 140. A gear motor 150 drives a pulley transmission belt 160 at a rotational speed limited by a slip ring 170. The shaft 140 turns a circular disk 180 along their shared axis perpendicular to the wheel's periphery. An obverse face 185 of the disk 180 receives radiant energy from a laser (not shown, but featured in application Ser. No. 17/524,886 incorporated by reference). The disk 180 mounts to an upright frame 190 supported by elbow brackets 195 and the base frame 120.

FIG. 2 shows an isometric exploded view 200 of components for the disk 180 and related rotating components of the FPC assembly 110. The disk 180 includes a circular instrument sensor plate 210 with peripheral attach points 215 and a yoke wheel 220 having a shaft hole 225. On its reverse face opposite the obverse face 185, the sensor plate 210 includes a spiral groove 230 extending from center to periphery to receive temperature instrumentation, such as voltage response based on electrical resistance.

A set of four spacers 240 connect the wheel 220 to the plate 210 via corresponding screws 245. A central hub collar 250, including a sleeve 255 and a radial flange 260 attach the shaft 140 through the axis hole 225 of the wheel 220. The screws 245 pass through the spacers 240 and into their corresponding attach points 215 of the plate 210 along respective axes 265. The slip ring 170 passes FPC signal wires 270 inside the shaft 140 from the plate 210 to a stationary data acquisition device (not shown) via electrode prongs 280 that extend beyond the base frame 120. A breakout board 290 ties the wires 270 from the temperature instrumentation along the groove 230 to the slip ring 170 and attaches to one of the spokes on the wheel 220.

The spinning FPC assembly 110 described is shown in view 100. The device assembly 110 includes an aluminum frame 120 that supports distal bearings 130 for the hollow shaft 140. A gear motor 150 drives the shaft 140 via a power transmission belt 160. The rotational speed of the motor 150 is limited by the capabilities of the slip ring 170 that passes the FPC signal wires 270 from the rotating plate 210 to a stationary data acquisition (DAQ) device (not shown).

Details of the spinning assembly are shown in view 200. The sensor plate 210 absorbs a fraction of the laser power depending on the absorptivity of its surface coating. The absorbed laser energy causes the sensor plate 210 to rise in temperature. The reverse side of the sensor plate 210 (opposite its obverse face 185) contains a spiral groove 230 that contains multiple passes of a 30-gage enamel-coated copper wire held in place with a rubber O-ring. This sensing wire's resistance is proportional to the average temperature of the sensor plate 210 and is used to accurate measure the resulting temperature rise.

Figure 3:
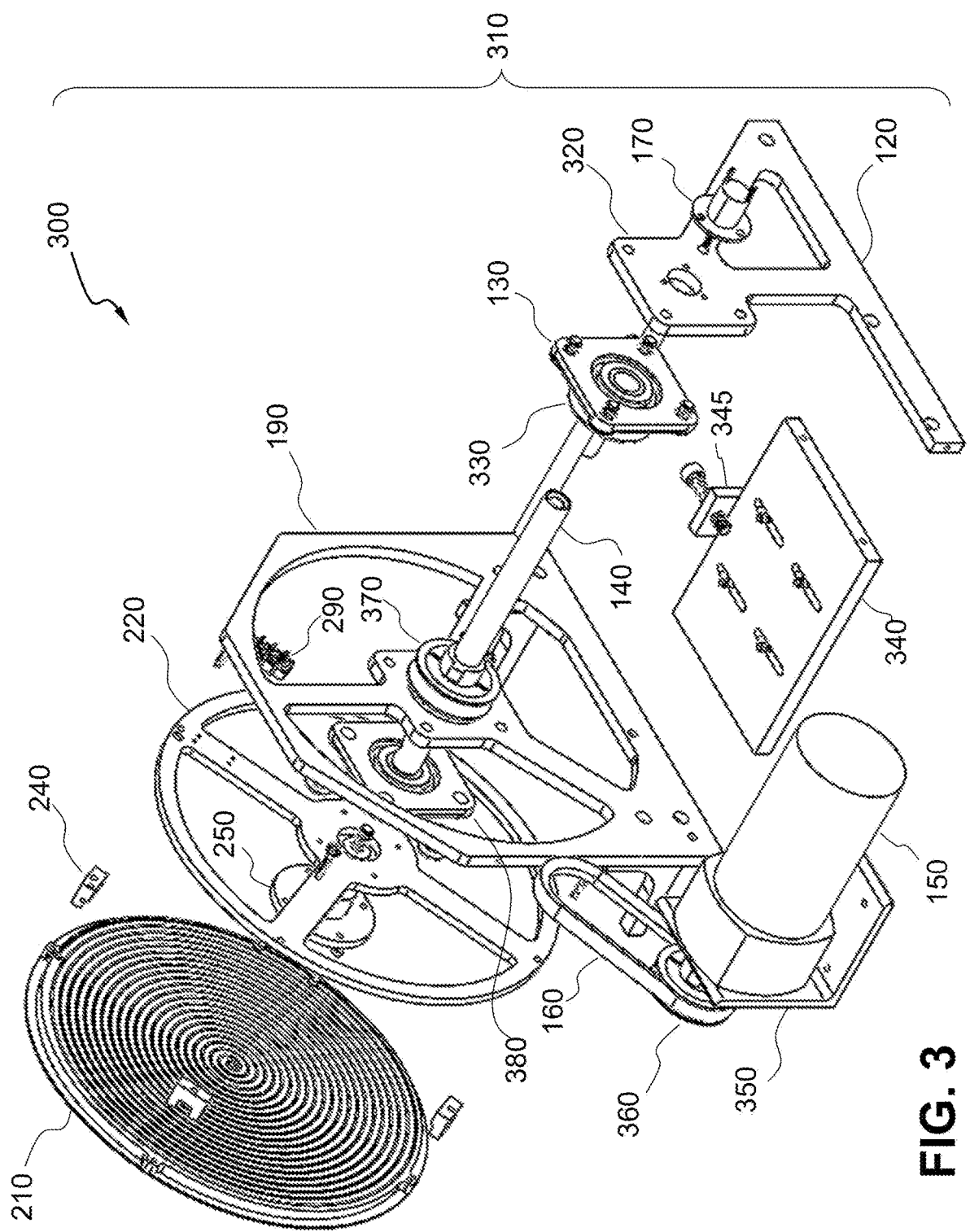
FIG. 3 is an isometric exploded view of components of the FPC device.

FIG. 3 shows an isometric exploded view 300 of components 310 of the FPC assembly 110. The base frame 120 includes a square flange 320 that holds the distal bearings 130 and a bearing wheel 330, which connects to the shaft 140. A flat mount plate 340 with a belt-tensioning jack screw 345 also mounts to the base frame 120 that connects to a test platform table, while the upright frame 190 connects to the base frame 120. The mount plate 340 with frames 120 and 190, along with brackets 195 and 350 constitute a disk support structure for attaching to the table.

The motor 150 mounts to an L-shape motor bracket 350 and turns a drive pulley 360 connected to the transmission belt 160 that a shaft pulley 370 on the upright frame 190. Proximal bearings 380 connect the yoke wheel 220 to the upright frame 190. The shaft 140 can also to pass through the collar 250, the proximal bearings 380 and the wheel 220.

The sensor plate 210 is mounted offset from the yoke wheel 220 with four spacers 240 composed of high-temperature polyether ether ketone (PEEK) plastic ($C_{19}H_{14}O_3$) to thermally isolate the sensor plate 210 from the aluminum yoke wheel 220. The four screws 245 that mount the sensor plate 210 to the wheel 220 are also composed of PEEK for thermal isolation. The wheel 220 bolts to a central hub collar 250 that attaches the entire disk 180 to the hollow shaft 140 for spinning. The collar 250 features a hole in its sleeve 255 that enables the signal wires 270 to pass from the sensor plate 210 through the hollow shaft 140 to the slip ring 170.

Figure 4:
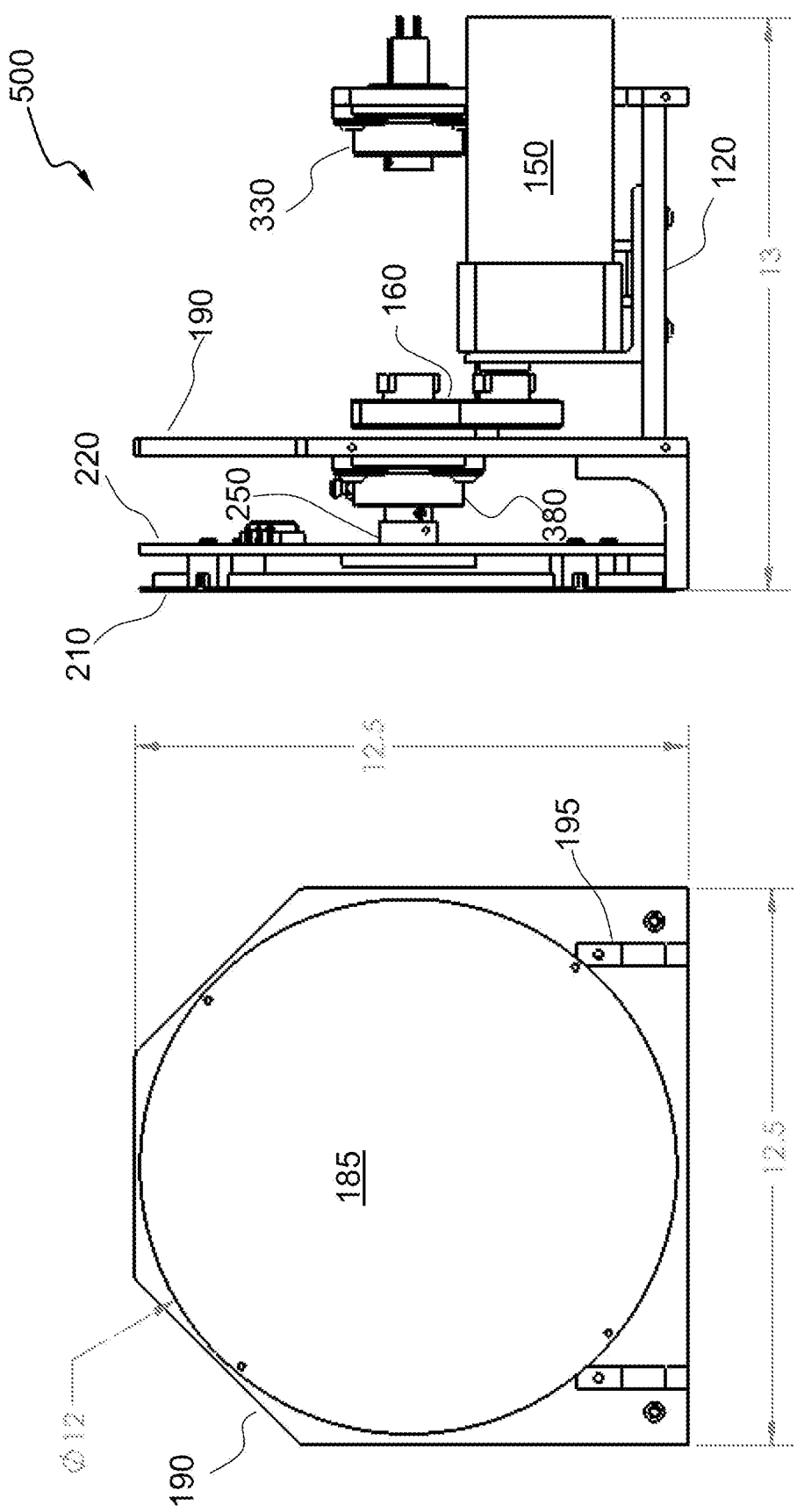
FIG. 4 is a set of elevation views of the FPC device.

FIG. 4 shows elevation views 400 featuring the relative size of the exemplary assembly 110 (omitting the shaft 140). In this configuration, a 12-inch diameter sensor plate 210 is used, and the assembly 110 can fit into a 12.5"×12.5"×13" box. The upright frame is 12.5" in width and height, and the length from the motor 150 to the sensor plate 210 is 13". This size is exemplary only.

By spinning the FPC as the sensor plate 210, the fluence limit of the sensor can easily be increased by an order of magnitude. That tolerance improvement can be used to either increase the total power of the laser that can be tested, or increase the duration of the engagement. Furthermore, because spinning targets are already routinely used for beam imagining, the exemplary device 110 can be used for both power measurement and beam imaging thereby eliminating a required piece of equipment. Also, any variation in surface absorptivity will be averaged out by the spinning motion, which leads to more accurate power measurements compared to a static power meter.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fail within the true spirit of the embodiments.

What is claimed is:

1. A spinning flat plate calorimeter device for receiving and measuring laser energy, said device comprising:
   a circular disk having temperature-detection instrumentation for measuring temperature from the laser energy;
   a shaft supported by distal and proximal bearings and attaching to said disk;
   a structure for supporting said disk, said shaft and said bearings; and
   a motor for turning said shaft and said disk.

2. The device according to claim 1, wherein said structure includes:
   a base frame for supporting said shaft and said bearings;
   a motor bracket for supporting said motor;
   an upright frame for supporting said disk; and
   a flat mount plate for attaching to a test platform.

3. The device according to claim 1, wherein said disk further includes:
   a flat plate having an obverse face for receiving the laser energy and a reverse face having a spiral groove for attaching said instrumentation;
   a yoke wheel for attaching to said shaft; and a plurality of thermal isolator spacers for mechanically attaching said yoke wheel to an obverse rim on said flat plate.

4. The device according to claim 3, wherein said instrumentation is composed of copper wire disposed within said groove.

5. The device according to claim 4, further including an o-ring to secure said copper wire within said groove.

6. The device according to claim 3, wherein said thermal isolator spacers are composed of polyether ether ketone.

7. The device according to claim 1, further including a pulley belt for transmitting rotation from said motor to said shaft.

8. The device according to claim 1, wherein said shaft is hollow to enable electrical wires from said instrumentation to pass beyond said structure.

9. The device according to claim 1, wherein said instrumentation is based on electrical resistance.

10. The device according to claim 1, wherein said structure is composed of aluminum.

* * * * *